(12) United States Patent
Cahill (10) Patent No.: US 8,538,654 B2
(45) Date of Patent: Sep. 17, 2013

(54) SYSTEMS AND METHODS FOR IMPROVED AIRCRAFT BRAKING

(75) Inventor: Eric D. Cahill, Troy, OH (US)

(73) Assignee: Goodrich Corporation, Charlotte, NC (US)

(*) Notice: Subject to any disclaimer, the term of this patent is extended or adjusted under 35 U.S.C. 154(b) by 0 days.

(21) Appl. No.: 13/227,304

(22) Filed: Sep. 7, 2011

(65) Prior Publication Data

US 2013/0060441 A1   Mar. 7, 2013

(51) Int. Cl.
*B60T 8/24*   (2006.01)
*G06F 7/00*   (2006.01)
*G06F 17/00*  (2006.01)
*G06G 1/00*   (2006.01)

(52) U.S. Cl.
USPC ........ 701/72; 701/3; 701/70; 701/71; 701/78; 303/157; 303/158; 303/167; 303/168; 303/169; 303/170; 303/175; 303/176; 180/244; 180/275

(58) Field of Classification Search
USPC ............... 701/3, 7, 70, 71, 72, 74, 75, 82, 90, 701/91; 180/197, 244, 275; 303/163–180
See application file for complete search history.

(56) References Cited

U.S. PATENT DOCUMENTS

| 3,880,475 | A | * | 4/1975 | Booher | 303/195 |
| 3,888,549 | A | * | 6/1975 | Grosseau | 303/163 |
| 5,109,694 | A | * | 5/1992 | Yahagi et al. | 73/9 |
| 5,428,540 | A | * | 6/1995 | Okubo | 701/74 |
| 6,220,676 | B1 | * | 4/2001 | Rudd, III | 303/150 |
| 2004/0124701 | A1 | * | 7/2004 | Nihei et al. | 303/163 |
| 2005/0242659 | A1 | * | 11/2005 | Salamat et al. | 303/3 |
| 2006/0080021 | A1 | * | 4/2006 | Park et al. | 701/71 |
| 2008/0154471 | A1 | * | 6/2008 | Garcia et al. | 701/75 |
| 2009/0115248 | A1 | * | 5/2009 | Salamat et al. | 303/155 |

* cited by examiner

*Primary Examiner* — Thomas H. Tarcza
*Assistant Examiner* — Rami Khatib
(74) *Attorney, Agent, or Firm* — Snell & Wilmer L.L.P.

(57) ABSTRACT

Systems and methods disclosed herein may be useful for braking systems for use in, for example, an aircraft. A method is disclosed comprising determining, at a brake controller, an aircraft reference speed for an aircraft having a first wheel and a second wheel, identifying, at the brake controller, a state comprising the first wheel having a different rotational velocity than the second wheel, wherein the difference in rotational velocity sums to about zero, calculating, at the brake controller, a compensation factor for at least one of the first wheel and the second wheel, and adjusting, at the brake controller, a locked wheel trigger velocity in accordance with the compensation factor.

14 Claims, 5 Drawing Sheets

SYSTEMS AND METHODS FOR IMPROVED AIRCRAFT BRAKING

FIELD

The present disclosure is related to systems and methods for aircraft braking for use in, for example, an aircraft.

BACKGROUND

Aircraft braking systems often include locked wheel protection. Locked wheel protection prevents wheel lock in circumstances where tire skidding would have otherwise occurred, for example, during landing on a runway with a low coefficient of friction, such as an icy runway. Tire skidding occurs when a tire ceases or substantially ceases to rotate relative to a landing surface (e.g., runway), resulting in sliding of the tire. Tire skidding may cause an aircraft to lose directional control, which is typically hazardous. Aircraft may be steered by selectively applying braking to one or more wheels. For example, an aircraft may be steered to the left by selectively applying the left side brakes, causing the aircraft to pivot about the left side wheels. In certain low speed applications, a locked wheel protection system may interpret such steering methods as an imminent tire skid, and thus apply locked wheel protecting techniques. However, in these applications, the locked wheel protecting techniques typically result in unpredictable aircraft movements, and thus, may be disconcerting to the pilot. For example, a locked wheel protecting technique may comprise releasing all braking pressure. Such a locked wheel protecting technique may disrupt steering. Thus, improved braking systems are desirable.

SUMMARY

Systems and methods disclosed herein may be useful in braking systems. In this regard, in various embodiments, a method is provided comprising determining, at a brake controller, an aircraft reference speed for an aircraft having a first wheel and a second wheel; identifying, at the brake controller, a state comprising the first wheel having a different rotational velocity than the second wheel, wherein the difference in rotational velocity sums to about zero; calculating, at the brake controller, a compensation factor for at least one of the first wheel and the second wheel; and adjusting, at the brake controller, a locked wheel trigger velocity in accordance with the compensation factor.

In various embodiments, a system is provided comprising a brake controller having locked wheel protecting functionality comprising a locked wheel trigger velocity, a first wheel velocity sensor and a second wheel velocity sensor, wherein the first wheel velocity and the second wheel velocity are available to the brake controller, wherein the brake controller receives the identifies a state comprising the first wheel velocity is different from the second wheel velocity, wherein the difference in rotational velocity sums to about zero, wherein the brake controller calculates a compensation factor for at least one of the first wheel and the second wheel, and wherein the brake controller adjusts a locked wheel trigger velocity in accordance with the compensation factor.

In further embodiments, a computer readable medium is provided wherein the computer readable medium bears instructions for braking, the instructions, when executed by a brake controller, cause the brake controller to perform operations comprising determining, at the brake controller, an aircraft reference speed for an aircraft having a first wheel and a second wheel; identifying, at the brake controller, a state comprising the first wheel having a different rotational velocity than the second wheel, wherein the difference in rotational velocity sums to about zero; calculating, at the brake controller, a compensation factor for at least one of the first wheel and the second wheel; and adjusting, at the brake controller, a locked wheel trigger velocity in accordance with the compensation factor.

BRIEF DESCRIPTION OF THE DRAWINGS

Below is a summary of the drawing figures, wherein like numerals denote like elements and wherein.

DETAILED DESCRIPTION

The detailed description of exemplary embodiments herein makes reference to the accompanying drawings, which show exemplary embodiments by way of illustration and its best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Moreover, many of the functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Systems and methods disclosed herein may be useful for braking systems. Although the embodiments herein are described with reference to braking systems used in connection with aircraft, such embodiments are provided for example only as it is contemplated that the disclosures herein have applicability to other vehicles, such as for example, automobiles.

Aircraft braking systems typically receive braking commands (e.g. from a pilot or copilot) via pedals that are conventionally operated with a foot or feet. The amount of pedal deflection typically corresponds to the amount of braking force desired or, in some aircraft, pedal deflection varies in accordance with desired deceleration. In a common aircraft configuration, the pilot and copilot each have a left pedal and a right pedal. The left pedal controls the brakes on the wheels on the left side of the aircraft and the right pedal controls the brakes on the wheels on the right side of the aircraft. It should be noted that there may be one or more wheels coupled to one or more brakes on each the left side and the right side of the aircraft. To effect steering, a pilot or copilot may selectively apply braking to one side of the aircraft. Thus, increased braking on the left wheels will effect a left-hand turn of the aircraft. As the turn occurs, the left wheels will slow down and the right wheels will speed up, but the aircraft reference speed may remain constant in certain circumstances. The aircraft reference speed may comprise the overall velocity of the aircraft. For example, the aircraft reference speed may be the speed of the center of the aircraft.

Aircraft may comprise one or more types of aircraft wheel and brake assemblies. For example, an aircraft wheel and brake assembly may comprise a non-rotatable wheel support, a wheel mounted to the wheel support for rotation, and a brake disk stack. The brake disk stack may have front and rear axial ends and alternating rotor and stator disks mounted with respect to the wheel support and wheel for relative axial movement. Each rotor disk may be coupled to the wheel for rotation therewith and each stator disk is coupled to the wheel support against rotation. A back plate may be located at the rear end of the disk pack and a brake head may be located at the front end. The brake head may house one or more actuator rams that extend to compress the brake disk stack against the back plate. Torque is taken out by the stator disks through a static torque tube or the like.

The actuator rams may be electrically operated actuator rams or hydraulically operated actuator rams, although some brakes may use pneumatically operated actuator rams. In brake systems that employ fluid powered (hydraulic or pneumatic power) actuator rams, the actuator ram may be coupled to a power source via a brake servo valve ("BSV") and a shutoff valve ("SOV"). The SOV effectively functions as a shutoff valve, wherein in a first position (e.g., an armed position) fluid pressure is permitted to pass through the valve. While in a second position (e.g., a disarmed position), fluid pressure is prevented from passing through the valve. During normal braking, the SOV is in the armed position, thereby permitting the flow of fluid pressure. The BSV, based on braking commands from the pilot (often via an electronic controller that may implement, for example, locked wheel protection logic), controls the amount of fluid pressure provided to the actuator ram, and thus, the braking force applied to the wheel. To prevent unintentional braking (e.g., due to a faulty servo valve) at various times, the SOV is set in the disarmed position, thereby removing fluid pressure from the BSV. Since the BSV does not receive fluid pressure, it cannot provide fluid pressure to the actuator ram, and thus, braking cannot be effected.

In electronic brakes, a brake controller is coupled to one or more electromechanical actuator controllers ("EMAC") for brakes which drives one or more electromechanical brake actuators. As discussed above, an aircraft may have one or more brake pedals that receive braking commands. Braking commands may be received at a brake controller. A brake controller may comprise a module that comprises a processor, a non-transitory, tangible memory, and braking logic. The brake controller may process the braking commands received from the brake pedal using braking logic and provide commands to other components, such as an EMAC or a BSV. Braking logic may include locked wheel protection functionality. Locked wheel protection functionality may have the capability to determine when one or more wheels may enter a skid and then cause locked wheel protecting techniques to be applied. A skid may be identified by, for example, detecting one wheel slowing to below a certain proportion of the aircraft reference speed. Thus, an aircraft at 100 knots having a wheel that is rotating at 50 knots (i.e., wheel rotation at 50% of aircraft reference speed) may indicate that the wheel is skidding. For example, one locked wheel protecting technique comprises partially releasing pressure on the brake so that the wheel may regain traction with the landing surface. During a prolonged skid, one locked wheel protecting technique is to release all brake pressure.

Locked wheel protecting functionality may include a trigger velocity. Trigger velocity is a velocity below which the brake controller triggers locked wheel protecting techniques. Trigger velocity may comprise a particular speed or a proportion of the aircraft reference speed. For example, about 10 knots may comprise a trigger velocity or about 50% of aircraft reference speed may comprise a drop trigger out velocity. A trigger velocity may comprise a range. For example, if a trigger velocity may include 50% of aircraft reference speed and 150% of aircraft reference speed. When the trigger velocity occurs, locked wheel protecting techniques (e.g., full or partial release of brake pressure) are used.

However, as discussed above, during aircraft steering, the aircraft reference speed may exceed the trigger velocity yet, in certain circumstances, locked wheel protection functionality is undesirable. For example, an aircraft with a trigger velocity of 50% of aircraft reference speed may enter a left turn at 20 knots. The left wheel may slow to 10 knots, thus triggering the brake controller to employ locked wheel protecting techniques. In this scenario, the left wheel will have braking pressure released, and the aircraft will handle in a manner inconsistent with pilot/copilot commands. In like manner, if the trigger velocity has an upper limit, such as 150% of aircraft reference speed, the outer wheel in a turn may exceed the trigger velocity. The range of velocities where locked wheel protecting techniques are not employed may be referred to as the trigger velocity range. A left wheel and right wheel may also be referred to as an inboard wheel and an outboard wheel, the inboard wheel being closer to the axis of the turning circle than the outboard wheel. The left wheel and right wheel may also be referred to as a first wheel and a second wheel.

Accordingly, systems and methods in accordance with various embodiments detect and/or identify a turning event (i.e., steering) and may determine a compensation factor. A compensation factor may comprise an adjustment value for use in adjusting the trigger velocity. A compensation factor may be a particular number or a percentage of aircraft reference speed. In this manner, the trigger velocity for a particular wheel may be raised or lowered such that locked wheel protecting techniques are not employed.

Figure 1:
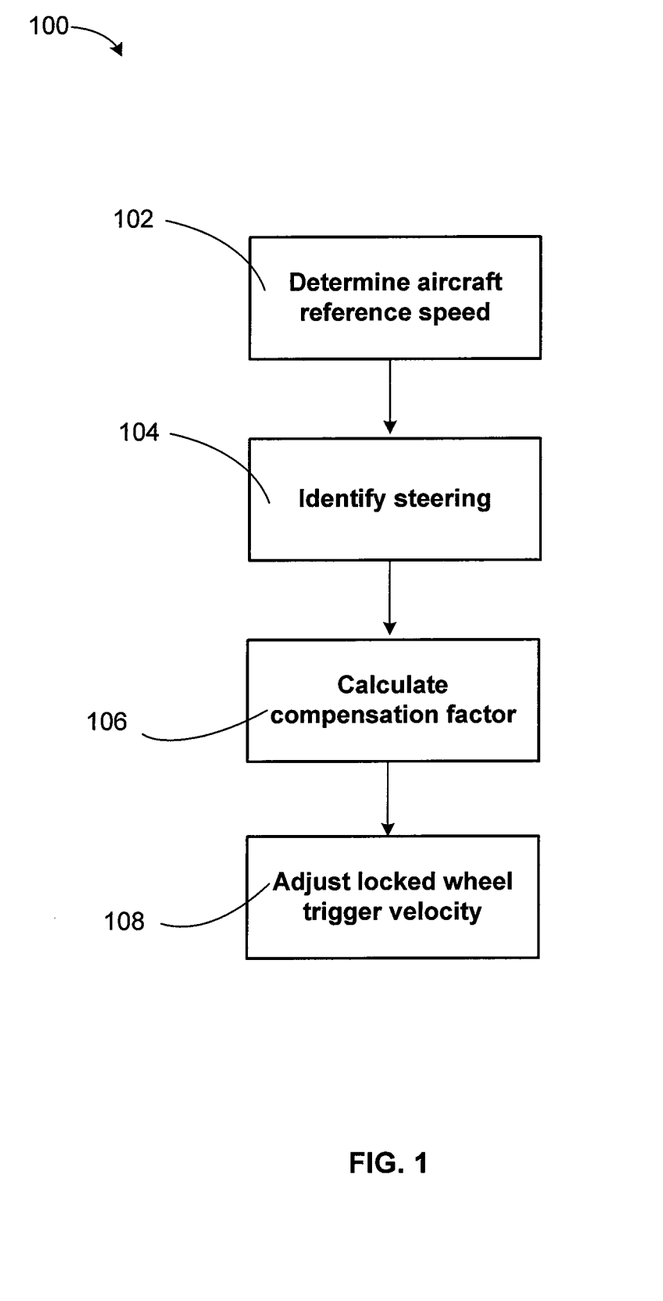
FIG. 1 illustrates a method in accordance with various embodiments.

Braking method 100 is illustrated in FIG. 1 in accordance with various embodiments. Determine aircraft reference speed 102 comprises determining the overall speed of the aircraft. Aircraft reference speed may be determined using any known method or methods that are developed herein. Aircraft reference speed may be determined by averaging wheel speed sensors, or through other means. Determine aircraft reference speed 102 may be performed by the brake controller or the aircraft reference speed may be received at the brake controller.

Identify steering 104 may comprise identifying that steering is occurring. Identify steering 104 may be performed by the brake controller. As discussed above, selective application of brakes may effect steering. Thus, the left wheels and right wheels may rotate at different speeds during steering. Moreover, during steering, the left wheels and right wheels change rotational velocities at the same or substantially the same rate. For example, if the left wheels slow by 2 knots, the right wheels will increase by 2 knots. By identifying that the left wheels and the right wheels differ by the same or substantially same amount, it may be determined that steering is occurring.

Commanded deceleration is a braking scheme wherein brake pedal deflection is correlated with a particular commanded deceleration. Commanded pressure is a braking scheme wherein brake pedal deflection is correlated with a particular commanded pressure to be applied at the brake. In aircraft that use commanded deceleration, the commanded deceleration may be subtracted from the current wheel speed to yield the future wheel speed. In aircraft that use commanded pressure, various methods may be used to identify steering. For example, when the difference in pressure between two wheels exceeds a particular threshold, steering may be identified, taking into account potential pressure differences due to other factors such as brake friction difference or cross winds.

In response to a steering event being identified in identify steering 104, calculate compensation factor 106 may occur. Calculate compensation factor 106 may comprise the calculation of a compensation factor to temporarily change the trigger velocity to compensate for the steering. A compensation factor may be determined using any suitable method. As should be appreciated, there are a number of ways to calculate a compensation factor, depending on aircraft geometry, configuration, turning force, and other factors. In various embodiments, the compensation factor may be set to adjust the trigger velocity such that locked wheel protecting techniques would not be used so long as a steering event is occurring. For example, an aircraft with a trigger velocity range of 50% of aircraft reference speed and 150% of aircraft reference speed may enter a left turn at 20 knots. The left wheel may slow to 10 knots. In response to the identification of steering (such as in identify steering 104), a compensation factor may be calculated to prevent the locked wheel protecting techniques from being employed on the left wheel. Thus in this example, a compensation factor may comprise 1 knot and/or the compensation factor may comprise 10% of aircraft reference speed. Accordingly, the left wheel will be remain within trigger velocity range during steering and locked wheel protecting techniques will be avoided.

A compensation factor may be calculated using the below relationship:

$$CF = \left[\frac{V_{wheel}}{V_{REF}} - 1\right] \times 100 + LW\_DELTA$$

Wherein CF is compensation factor, $V_{wheel}$ is the speed of the wheel being observed, $V_{ref}$ is the aircraft reference speed, and LW_DELTA is the trigger velocity.

A compensation factor may comprise a range of compensation factors. For example, in various embodiments, the compensation factor (CF) may be:

CF<0.015(aircraft reference speed)$^2$−0.85(aircraft reference speed)+14

Calculate compensation factor 106 may be repeated during the steering event to ensure that an appropriate compensation factor is being used.

Adjust locked wheel trigger velocity 108 comprises adjusting the locked wheel trigger velocity in accordance with the compensation factor. As mentioned above, the adjustment may be in the form of a change in the proportion of aircraft reference speed or a change in a particular aircraft reference speed. Adjust locked wheel trigger velocity 108 may be repeated during the steering event to ensure that the compensation factor is being implemented. Adjust locked wheel trigger velocity 108 may include adjusting the inner wheel to account for its decrease in rotational velocity and adjusting the outer wheel to account for its increase in rotational velocity. In various embodiments, the compensation factor will be the same for both wheels, only opposite in sign. Thus, a decrease of 3 knots on a left wheel will coincide with an increase of 3 knots on the right wheel.

In various embodiments, the turning radius may be used to identify steering and/or in calculating the compensation factor. Depending on aircraft dimensions, geometry and configuration, turning radii may be associated with an appropriate compensation factor. To that end, with reference to FIG. 4, method 400 is illustrated. Method 400 contains steps described above with reference to FIG. 1, but also includes derive turning radius 402.

Derive Turning Radius 402

Figure 2:
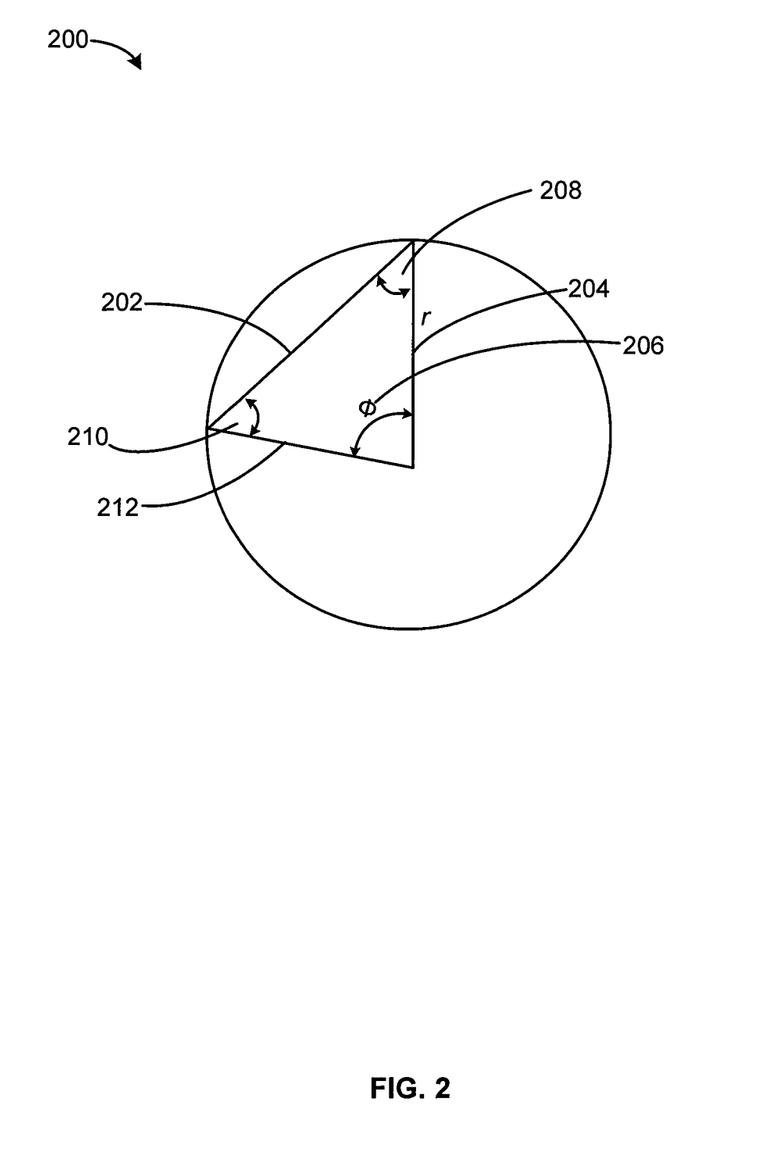
FIG. 2 illustrates an example of turning radius calculation.
Figure 4:
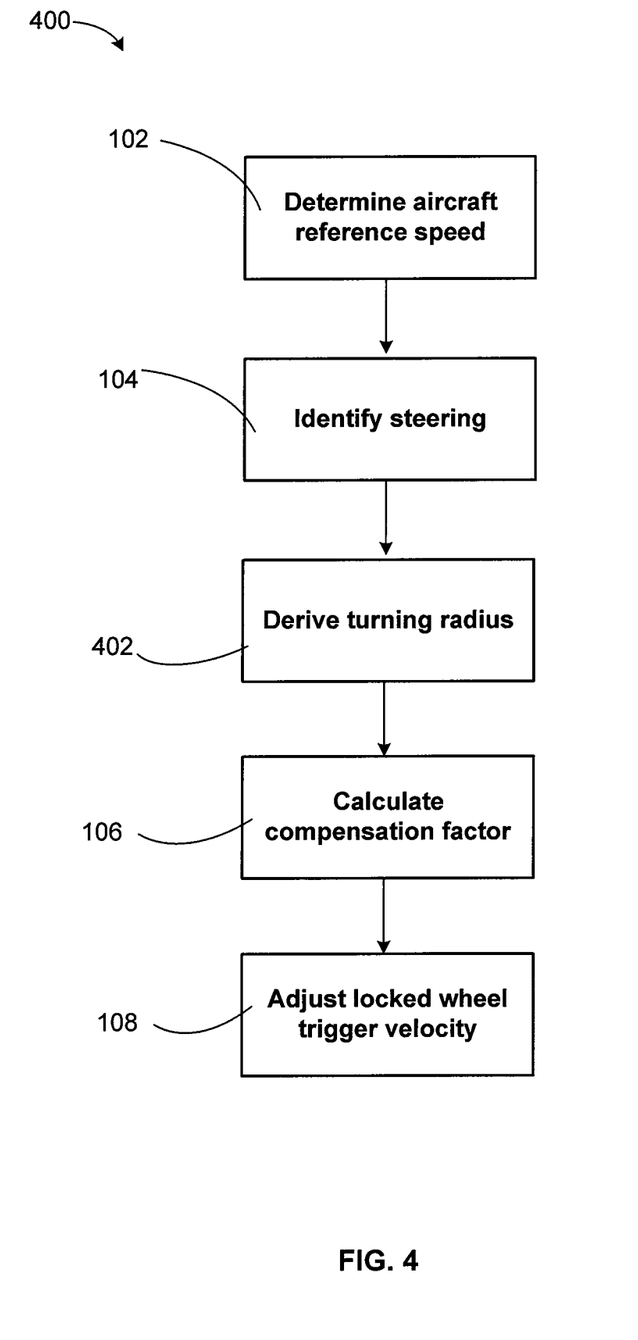
FIG. 4 illustrates a further method in accordance with various embodiments.

Derive turning radius 402 may comprise any method for determining a turning radius. Turning radius may be understood with reference to FIG. 2, wherein a turning radius example 200 is shown. Line 202 represents the length of an object making a turn. Radius 204 and Radius 212 illustrate multiple radii drawn from the terminals of line 202. Φ 206 represents the steering angle. Line 202 and radii 204 and 212 form a triangle having angles Φ 206 and angles 208 and 210, which are identical in value. It should be understood, of course, that the sum of the three angles of a triangle equal 180°. Thus, if Φ 206 is known and line 202 is known, then 180=Φ−2(x), where x equals the value of angle 208 and angle 210. Thus, radii 204 and 212 (i.e., the turning radius) may be determined using the law of $$\frac{a}{\sin A} = \frac{b}{\sin B} = \frac{c}{\sin C}$$

Figure 3:
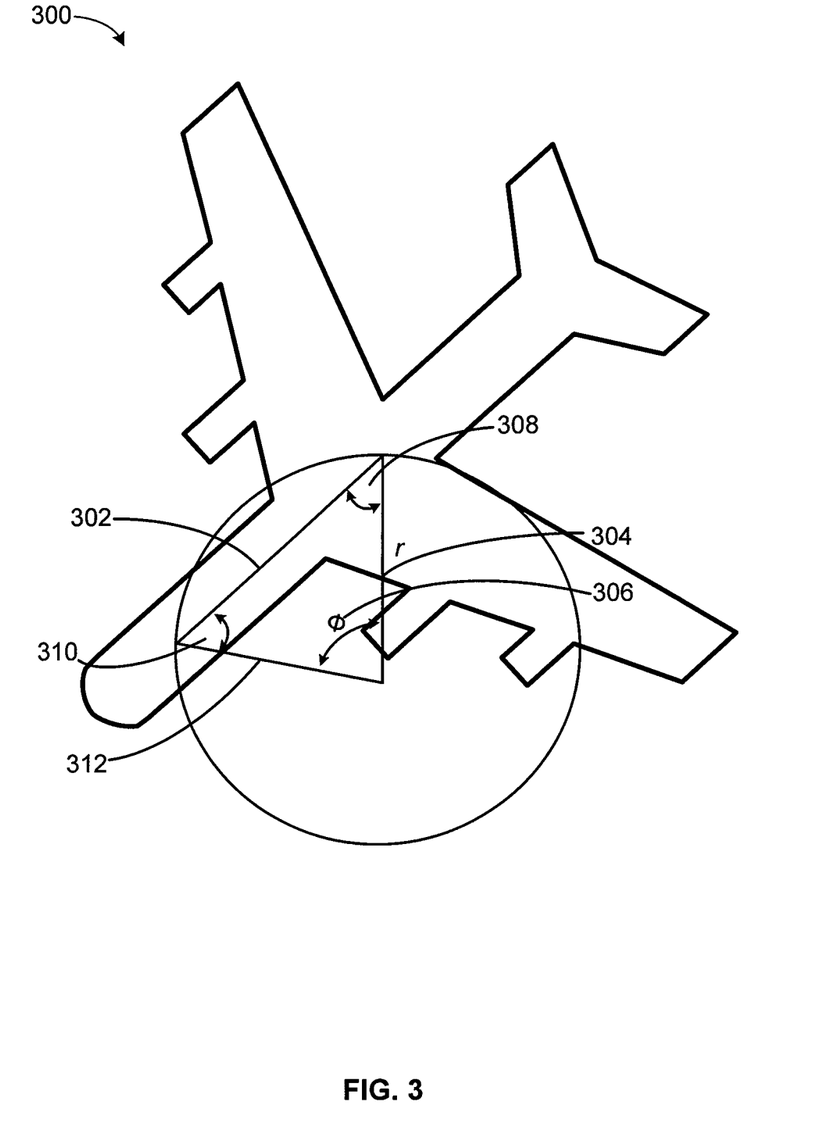
FIG. 3 illustrates an example of turning radius calculation in the aircraft context.

With reference to FIG. 3, a turning radius example 300 is shown in the aircraft contest. Aircraft length 302 represents the length of the aircraft as determined by the distance from the front wheels to its intersection with a line connecting the right wheels and the left wheels. Radius 304 and Radius 312 illustrate multiple radii drawn from the terminals of aircraft length 302. Φ 306 represents the steering angle. Line 302 and radii 304 and 312 form a triangle having angles Φ 306 and angles 308 and 310, which are identical in value. It should be understood, of course, that the sum of the three angles of a triangle equal 180°. Thus, if Φ 306 is known and line 302 is known, then 180=Φ−2(x), where x equals the value of angle 308 and angle 310. Thus, radii 304 and 312 (i.e., the turning radius) may be determined using the law of sines, per the above. With reference back to derive turning radius 402 may comprise the method of deriving a turning radius as described above with respect to the FIG. 3.

In the embodiment shown in FIG. 4, calculate compensation factor 106 includes calculating a compensation factor based upon the turning radius. Compensation factors may be predetermined and associated with various turning radii. In various embodiments, calculate compensation factor 106 includes logic to calculate a compensation factor in response to a turning radius. Typically, the smaller the turning radius, the larger the compensation factor will be because at least one wheel will slow more significantly than during a turn with a longer turning radius.

In various embodiments, the calculation of a compensation factor may occur only when aircraft reference speed is within a particular range. At lower speeds, aircraft reference speed may not be reliably calculated. In addition, various locked wheel protection functionality logic has a dropout velocity, below which locked wheel protecting techniques will not occur. Thus, a compensation factor would be unnecessary. At higher speeds, a wheel may not slow to below the trigger velocity and/or a turn may be potentially unsafe due to the higher speed. Thus, it may be desirable to use an upper limit beyond which a compensation factor is not used. In various embodiments, it has been found that compensation factors may be applied at speeds of between about 5 knots to about 50 knots and more preferably between about 10 knots and about 30 knots.

Figure 5:
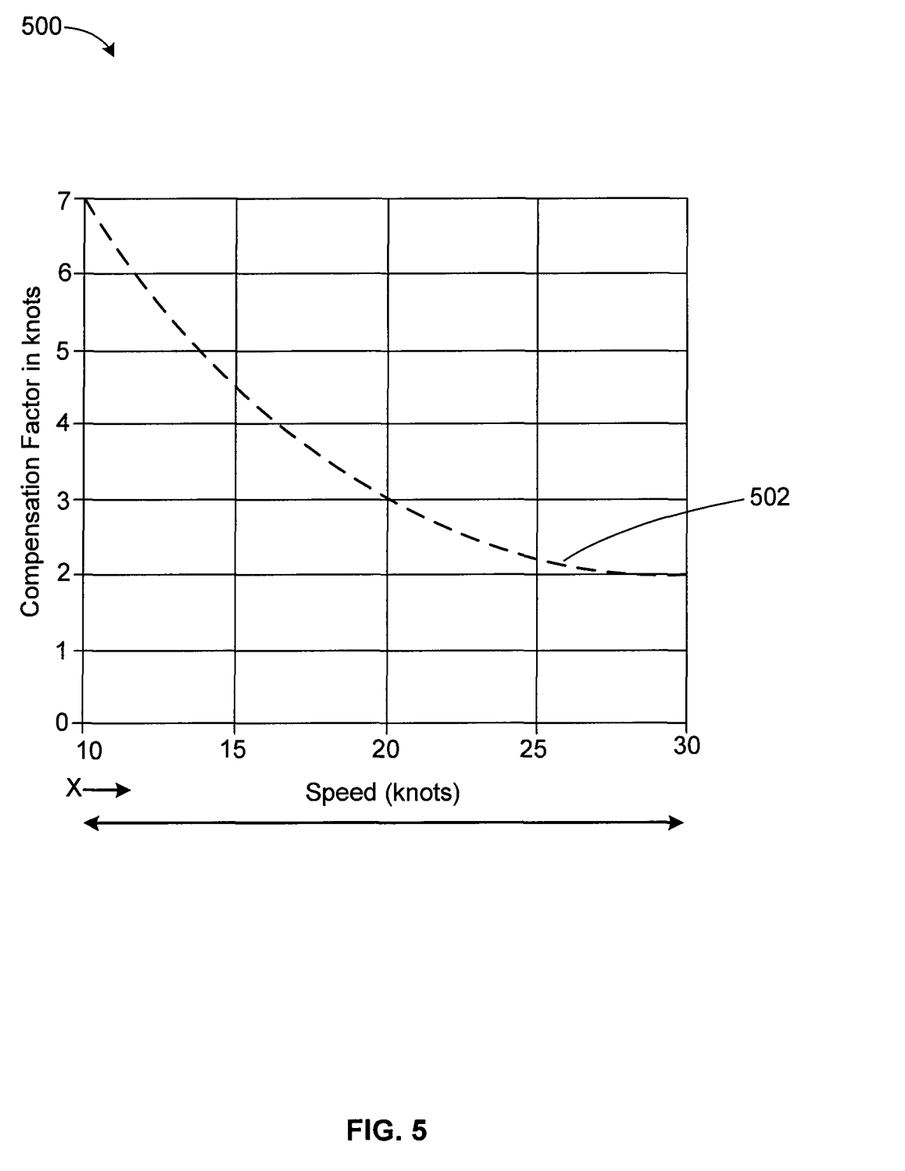
FIG. 5 illustrates an exemplary relationship in accordance with various embodiments.

FIG. 5 illustrates compensation factor curve 500. A simulation is run to plot compensation factors by aircraft reference speed. The y axis shows the compensation factor in knots and the x axis shows aircraft reference speed in knots. Curve 502 represents the compensation factor relationship:

$$CF < 0.015 (\text{aircraft reference speed})^2 - 0.85 (\text{aircraft reference speed}) + 14$$

As used herein, the meaning of the term "non-transitory computer-readable medium" should be construed to exclude only those types of transitory computer-readable media which were found in *In re Nuijten*, 500 F.3d 1346 (Fed. Cir. 2007) to fall outside the scope of patentable subject matter under 35 U.S.C. §101, so long as and to the extent *In re Nuijten* remains binding authority in the U.S. federal courts and is not overruled by a future case or statute. Stated another way, the term "computer-readable medium" should be construed in a manner that is as broad as legally permissible.

Systems, methods and computer program products are provided. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A method comprising
determining, at a brake controller, an aircraft reference speed for an aircraft having a first wheel and a second wheel;
identifying, at the brake controller, a state comprising the first wheel having a different rotational velocity than the second wheel, wherein a sum of a change in a rotational velocity of the first wheel and a change in a rotational velocity of the second wheel is zero;
deriving, at the brake controller, a turning radius of the aircraft;
calculating, at the brake controller, and in response to determining that the turning radius is below a threshold, a compensation factor for at least one of the first wheel and the second wheel; and
adjusting, at the brake controller, a locked wheel trigger velocity in accordance with the compensation factor.

2. The method of claim 1, wherein the aircraft reference speed remains constant.

3. The method of claim 1, wherein the adjusting occurs in response to an expiration of a preset amount of time.

4. The method of claim 1, wherein the compensation factor is expressed as a percentage of the locked wheel trigger velocity.

5. The method of claim 4, wherein the compensation factor is calculated using the formula:

$$CF = \left[\frac{V_{wheel}}{V_{REF}} - 1\right] \times 100 + \text{LW\_DELTA}$$

wherein CF is compensation factor, LW_DELTA represents the locked wheel trigger velocity $V_{wheel}$ is the speed of the wheel being observed, and $V_{ref}$ is the aircraft reference speed.

6. A non-transitory computer readable medium bearing instructions for braking, the instructions, when executed by a brake controller, cause the brake controller to perform operations comprising:
determining, at the brake controller, an aircraft reference speed for an aircraft having a first wheel and a second wheel;
identifying, at the brake controller, a state comprising the first wheel having a different rotational velocity than the second wheel, wherein a sum of a change in a rotational velocity of the first wheel and a change in a rotational velocity of the second wheel is zero;
deriving, at the brake controller, a turning radius of the aircraft;
calculating, at the brake controller, and in response to determining that the turning radius is below a threshold, a compensation factor for at least one of the first wheel and the second wheel; and
adjusting, at the brake controller, a locked wheel trigger velocity in accordance with the compensation factor.

7. The non-transitory computer readable medium of claim 6, wherein the aircraft reference speed remains constant.

8. The non-transitory computer readable medium of claim 6, wherein the adjusting occurs in response to an expiration of a preset amount of time.

9. The non-transitory computer readable medium of claim 6, the compensation factor is expressed as a percentage of the locked wheel trigger velocity.

10. The non-transitory computer readable medium of claim 9, where the compensation factor is calculated using the formula:

$$CF = \left[\frac{V_{wheel}}{V_{REF}} - 1\right] \times 100 + \text{LW\_DELTA}$$

wherein CF is compensation factor, LW_DELTA represents the locked wheel trigger velocity $V_{wheel}$ is the speed of the wheel being observed, and $V_{ref}$ is the aircraft reference speed.

11. A system comprising:

a brake controller having locked wheel protection functionality comprising a locked wheel trigger velocity;

a first wheel velocity sensor and a second wheel velocity sensor, wherein the first wheel velocity and the second wheel velocity are available to the brake controller;

wherein the brake controller identifies a state comprising the first wheel velocity is different from the second wheel velocity, wherein the difference in rotational velocity sums to zero;

wherein the brake controller determines an aircraft reference speed;

wherein the brake controller derives a turning radius of the aircraft;

wherein the brake controller calculates in response to determining that the turning radius is below a threshold, a compensation factor for at least one of the first wheel and the second wheel; and wherein the brake controller adjusts a locked wheel trigger velocity in accordance with the compensation factor.

12. The system of claim 11, wherein the aircraft reference speed remains constant.

13. The system of claim 11, wherein the brake controller represents the compensation factor as a percentage of the locked wheel trigger velocity.

14. The system of claim 11, wherein the brake controller adjusts the locked wheel trigger velocity in response to an expiration of a preset amount of time.

* * * * *